(12) United States Patent
Mihara

(10) Patent No.: US 11,009,147 B2
(45) Date of Patent: May 18, 2021

(54) VALVE DEVICE FOR FUEL TANK

(71) Applicant: PIOLAX, INC., Yokohama (JP)

(72) Inventor: Kenta Mihara, Yokohama (JP)

(73) Assignee: PIOLAX, INC., Yokohama (JP)

( * ) Notice: Subject to any disclaimer, the term of this patent is extended or adjusted under 35 U.S.C. 154(b) by 55 days.

(21) Appl. No.: 16/158,192

(22) Filed: Oct. 11, 2018

(65) Prior Publication Data

US 2019/0113149 A1  Apr. 18, 2019

(30) Foreign Application Priority Data

Oct. 16, 2017  (JP) .............................. JP2017-200528

(51) Int. Cl.
 *F16K 24/04* (2006.01)
 *B60K 15/03* (2006.01)
 *F16K 31/22* (2006.01)
 *B60K 15/035* (2006.01)
 *F16K 31/18* (2006.01)

(52) U.S. Cl.
 CPC .............. *F16K 31/22* (2013.01); *B60K 15/03* (2013.01); *B60K 15/03519* (2013.01); *F16K 24/044* (2013.01); *F16K 31/18* (2013.01); *B60K 2015/03289* (2013.01)

(58) Field of Classification Search
 CPC .................... F16K 24/044; B60K 2015/03289
 USPC ....................................................... 137/202
 See application file for complete search history.

(56) References Cited

U.S. PATENT DOCUMENTS

| | | | | |
|---|---|---|---|---|
| 5,832,950 A | * | 11/1998 | Shimada .......... | B60K 15/03519 137/202 |
| 2006/0108000 A1 | * | 5/2006 | Kaneko ................. | F16K 24/044 137/202 |
| 2009/0000669 A1 | * | 1/2009 | Kito ...................... | F16K 24/044 137/202 |
| 2016/0091107 A1 | | 3/2016 | Kaneko et al. | |

FOREIGN PATENT DOCUMENTS

JP  2016-068678 A  5/2016

* cited by examiner

*Primary Examiner* — Paul J Gray
(74) *Attorney, Agent, or Firm* — MGinn I.P. Law Group, PLLC

(57) ABSTRACT

There is provided a valve device for a fuel tank. A housing is provided with a valve chamber and a vent chamber defined via a partition wall. The partition wall is provided with an opening. A float valve is received in the valve chamber to be movable up and down. The float valve includes a lower member and an upper member. The upper member includes a top portion, an outside wall extending from the top portion, and an elastic engaging piece configured to engage with an engaged portion of the lower member. The elastic engaging piece extends from a location on the back surface of the top portion, which is located inward from the outside wall, and is configured to elastically return after being bent in an outward radial direction of the upper member and thus to engage with the engaged portion of the lower member.

20 Claims, 8 Drawing Sheets

VALVE DEVICE FOR FUEL TANK

CROSS-REFERENCE TO RELATED APPLICATIONS

The disclosure of Japanese Patent Application No. 2017-200528 filed on Oct. 16, 2017, including specification, drawings and claims is incorporated herein by reference in its entirety.

TECHNICAL FIELD

The present disclosure relates to a valve device for a fuel tank, which is attached to a fuel tank of an automobile and the like to be used as a fuel outflow prevention valve, a full tank regulation valve or the like.

BACKGROUND

On an automobile fuel tank, a full tank regulation valve for preventing overfeeding of fuel into the fuel tank in order to prevent a liquid surface in the fuel tank from being raised above a preset full tank liquid line, a fuel overflow prevention valve for preventing a leakage of fuel to the outside of the fuel tank when an automobile turns or tilts, and the like are attached.

In general, such valve devices have a structure, which includes a housing having a partition wall, which is provided with an opening, and a valve chamber, and a float valve for opening and closing the opening, arranged to be moveable up and down in the valve chamber. Also, a structure, in which a swingable upper member is provided above the float, is employed for the reason that a seal property against the opening is decreased when the float valve obliquely moves up.

For example, in Patent Document 1 as described below, a fuel shut-off valve is described, which includes a casing main body having a valve chamber and a top wall provided with a connection hole; a lid body fixed on top of the casing main body; and a float for opening and closing the connection hole, arranged in the valve chamber. An upper valve body is swingably mounted on top of the float via a valve support portion. Also, the upper valve body is constituted of a first valve portion, which is formed by a first valve body having a generally cylindrical shape and a rubber seat member attached on top thereof, and a second valve portion attached on the inside of the first valve portion and mounted on the outside of the valve support portion on top of the float. Further, a plurality of engaging pieces configured to be bendable via slits are suspended from a lower end of the first cylindrical valve portion, and an engaging hole is formed in each of the engaging pieces. In addition, a plurality of separation preventing claws configured to engage into the engaging holes is formed on an outer circumference of a lower portion of the second valve portion. Then, when the first valve portion is pushed onto the second valve portion while aligning the engaging pieces and engaging holes of the first valve portion with the plurality of separation preventing claws of the second valve portion, the engaging pieces are pressed by the separation preventing claws and thus elastically deformed in an outward radial direction. Then, if the separation preventing claws reach the engaging holes, the engaging pieces elastically return and thus the separation preventing claws engage with the engaging holes, so that the first valve portion and the second valve portion are attached to each other in a state where separation from each other is prevented.

Patent Document 1: Japanese Patent Application Publication No. 2016-068678 A

In the case of the fuel shut-off valve of Patent Document 1, it is necessary to elastically deform the engaging pieces of the first valve portion when attaching the first valve portion and the second valve portion to each other. Therefore, the engaging pieces need to have a certain length. However, if the engaging pieces have an increased length, a height of the first valve portion is also increased. Therefore, there is a problem that it is difficult to raise a position of a so-called lock point, which defines a full tank position of fuel supplied to the fuel tank (i.e., a height of fuel when the opening is closed).

SUMMARY

It is at least one of objects of the present disclosure to provide a valve device for a fuel tank, in which it is possible to reduce the entire height of a float valve, thereby allowing a position of a lock point of the fuel tank to become higher.

According to an aspect of the embodiments of the present disclosure, there is provided A valve device for a fuel tank, comprising: a housing provided with a valve chamber on a lower side thereof and a vent chamber on a upper side thereof defined via a partition wall therebetween, wherein the valve chamber communicates with the fuel tank and the vent chamber communicates with a fuel vapor discharging port, wherein the partition wall is provided with an opening communicating the valve chamber with the vent chamber; and a float valve for opening and closing the opening, received in the valve chamber to be movable up and down therein, wherein the float valve comprises a lower member forming a float main body and having an engaged portion, and an upper member attached on top of the lower member to be movable up and down by a predetermined distance relative to the lower member, wherein the upper member comprises a top portion configured to be connected with and separated from the opening, an outside wall extending from a back surface of the top portion, and an elastic engaging piece configured to engage with the engaged portion of the lower member, and wherein the elastic engaging piece extends from a location on the back surface of the top portion, which is located inward from the outside wall, and is configured to elastically return after being bent in an outward radial direction of the upper member and thus to engage with the engaged portion of the lower member.

According to the present disclosure, the elastic engaging piece, which is designed to elastically return after being bent in the outward radial direction of the upper member and thus to engage with the engaged portion of the lower member when the upper member is attached on the lower member, extends from a location on the back surface of the top portion of the upper member, which is located inward from the outside wall. Therefore, it is possible to ensure a long length (bending margin) of the elastic engaging piece. As a result, it is possible to reduce the entire height of the upper member, thereby reducing the entire height of the float valve and thus allowing a position of a so-called lock point to become higher.

BRIEF DESCRIPTION OF THE DRAWINGS

In the accompanying drawings:

FIGS. 2A and 2B show an upper member constituting the valve device, in which FIG. 2A is a perspective view thereof and FIG. 2B is a perspective view thereof as viewed in a direction different from FIG. 2A;

DETAILED DESCRIPTION OF THE EMBODIMENTS

Hereinafter, embodiments of a valve device for a fuel tank according to the present disclosure will be described with reference to FIGS. 1 to 8. Meanwhile, in the following description, it is assumed that the term "fuel" means a liquid fuel (also including a droplet of the fuel) and the term "fuel vapor" means a vaporized fuel.

Figure 7:
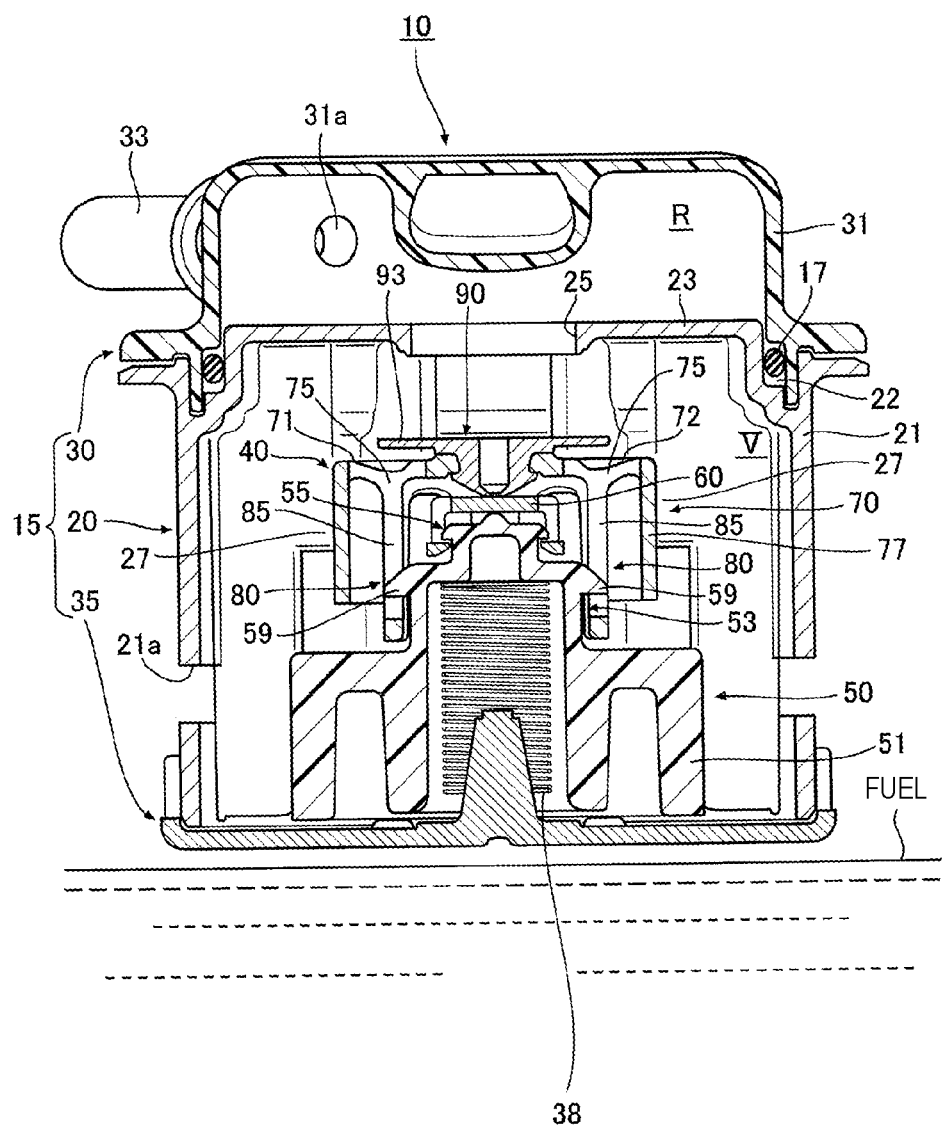
FIG. 7 is a sectional view of the valve device in a state where the float valve moves down and thus an opening is opened.

As shown in FIG. 7, a valve device 10 for a fuel tank (hereinafter, simply referred to as a valve device 10) according to the present embodiment has a housing 15, which includes a generally cylindrical housing main body 20 provided with a partition wall 23 on an upper side thereof, an upper cover 30 mounted on top of the housing main body 20, and a lower cap 35 mounted on bottom of the housing main body 20.

Also, as shown in FIG. 7, by mounting the lower cap 35 on bottom of the housing main body 20, a valve chamber V communicating with a fuel tank (not shown) is defined on a lower side of the housing via the partition wall 23, whereas by mounting the upper cover 30 on top of the housing main body 20, a vent chamber R communicating with a fuel vapor discharging port (not shown) is defined on an upper side of the housing via the partition wall 23.

Figure 1:
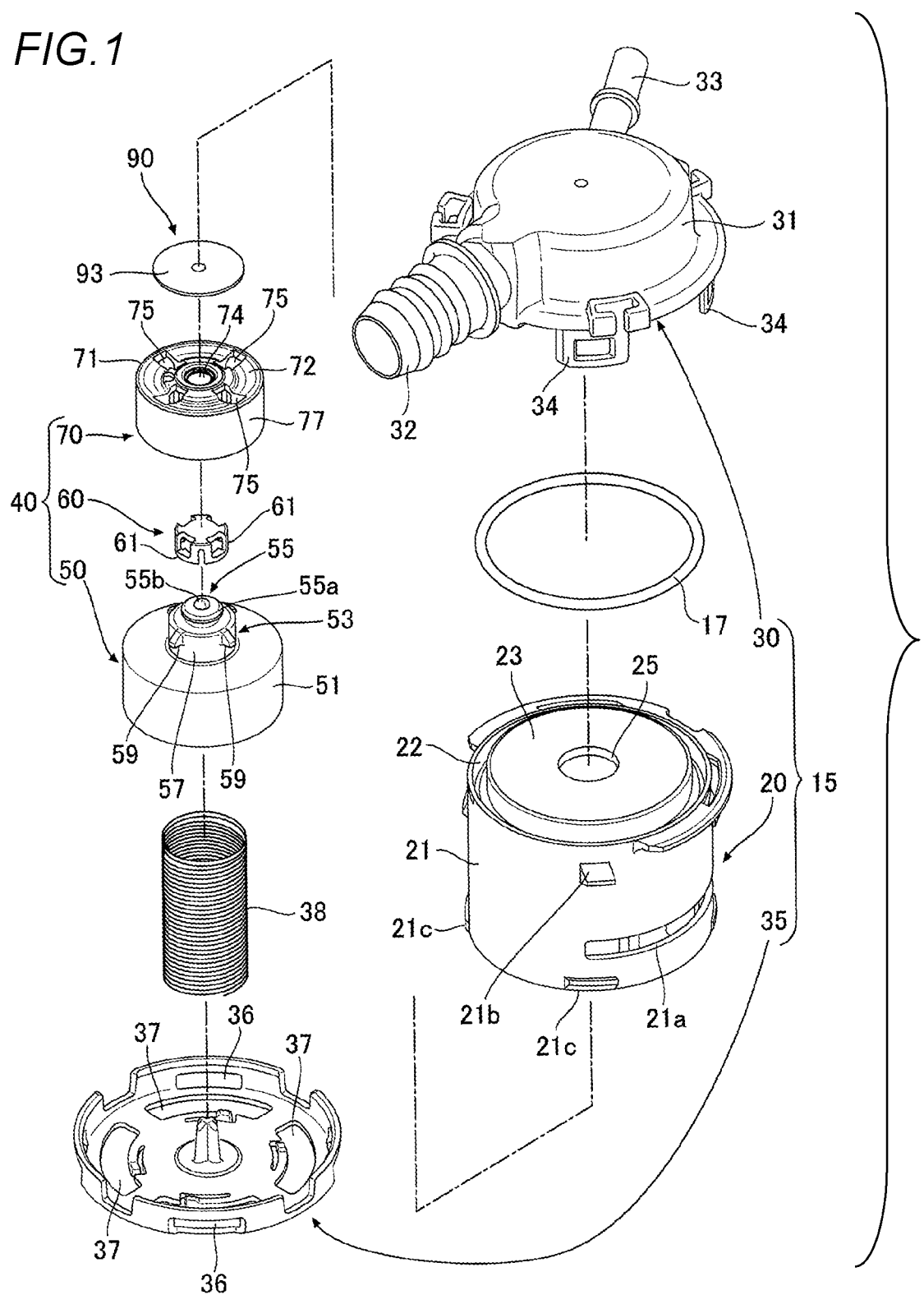
FIG. 1 is an exploded perspective view showing one embodiment of a valve device for a fuel tank according to the present disclosure.
Figure 8:
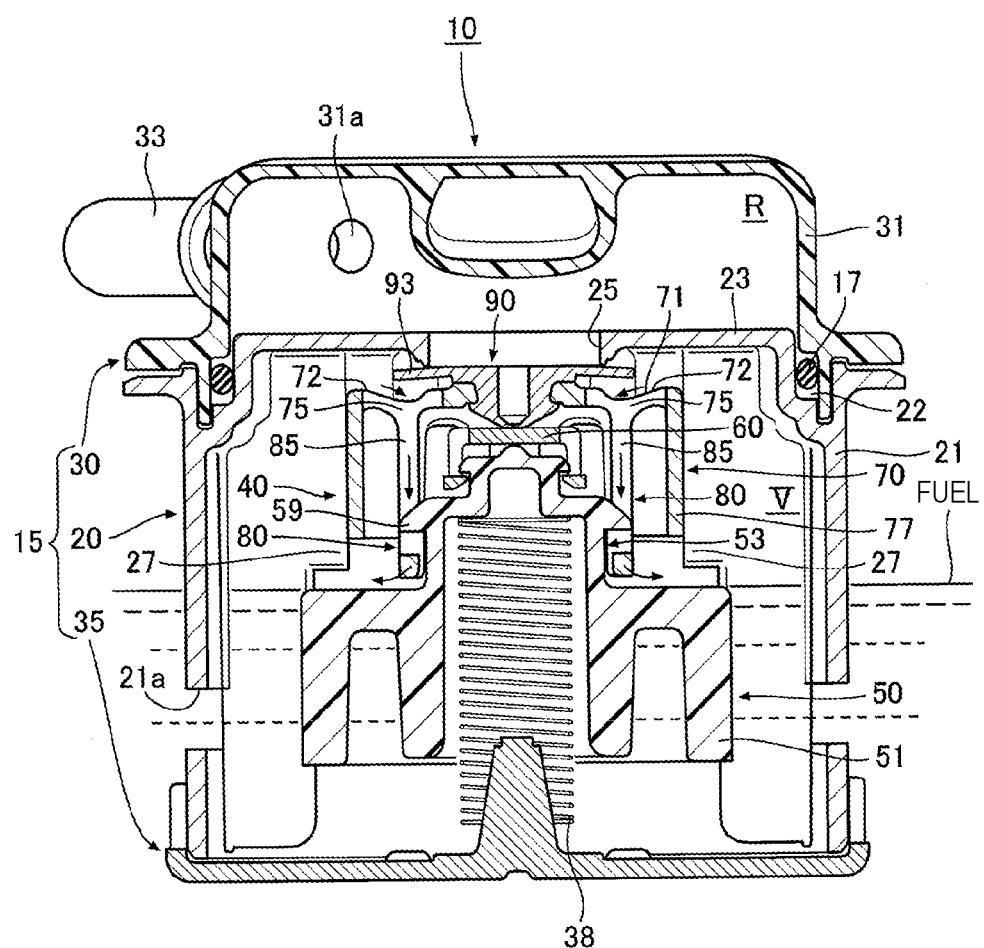
FIG. 8 is a sectional view of the valve device in a state where the float valve moves up and thus the opening is closed.

As shown in FIG. 1, the housing main body 20 is formed in a generally cylinder shape opened at a lower side thereof and has a peripheral wall 21 having a venting groove 21a formed on a lower side thereof. A plurality of locking claws 21b protrude from locations on an outer circumference of the peripheral wall 21, which are located close to an upper side thereof, and also a plurality of locking claws 21c protrude from a lower edge of the outer circumference of the peripheral wall 21. Further, a ring mounting groove 22 is formed on an upper inner circumference of the peripheral wall 21, so that the partition wall 23 having a circular disc shape is arranged inward from the ring mounting groove 22. A circular opening 25 is formed at the center of the partition wall 23. Further, as shown in FIGS. 7 and 8, a plurality of thin plate-shaped guide ribs 27 are formed on the inner circumference of the peripheral wall 21 to extend from the middle thereof in a height direction up to the partition wall 23.

Also, the upper cover 30 is formed in a generally hat shape closed at an upper side thereof, and a first connection pipe 32 and a second connection pipe 33 extend radially outward from predetermined locations on a peripheral wall 31 thereof. The first connection pipe 32 is configured to be connected with a tube, which is connected to a canister (not shown) arranged on the outside of the fuel tank. Meanwhile, the second connection pipe 33 is configured to be connected with a tube, which is connected to a check valve, a cut valve or the like (not shown).

Further, the first connection pipe 32 extends from a fuel vapor discharging port (not shown) provided on the peripheral wall 31, and the second connection pipe 33 extends from a communication hole 31a (see FIG. 7) provided on the peripheral wall 31. Further, frame-shaped locking pieces 34 extend from a lower side of the peripheral wall 31. Accordingly, by locking the locking pieces 34 on the locking claws 21b of the housing main body 20, the upper cover 30 is mounted on top of the housing main body 20. In addition, as shown in FIG. 7, a gap between an inner circumference of a lower edge portion of the peripheral wall 31 of the upper cover 30 and a peripheral surface of an outer circumference of the partition wall 23 of the housing main body 20 is sealed by a seal ring 17 mounted in the ring mounting groove 22.

Also, as shown in FIG. 1, the lower cap 35 has a plurality of locking holes 36 formed on a peripheral wall thereof. Accordingly, by locking the locking claws 21c of the housing main body 20 into the locking holes 36, the lower cap 35 is mounted on bottom of the housing main body 20. Further, on a bottom surface of the lower cap 35, a plurality of through-openings 37 are formed to be communicated with the valve chamber V (see FIG. 1).

Also, in the valve chamber V, a float valve 40 for opening and closing the opening 25 of the housing 15 is arranged to be movable up and down via a spring 38 interposed between the lower cap 35 and the float valve 40. The float valve 40 according to the present embodiment consists essentially of a lower member 50 forming a float main body for generating a buoyancy when being immersed into the fuel; an upper member 70 attached on top of the lower member 50 to be movable up and down by a predetermined distance relative to the lower member 50 and also to be tiltable relative to the lower member 50; a seal member 90 mounted on the upper member 70; and a intermediate valve body 60 arranged between the lower member 50 and the upper member 70.

Figure 6:
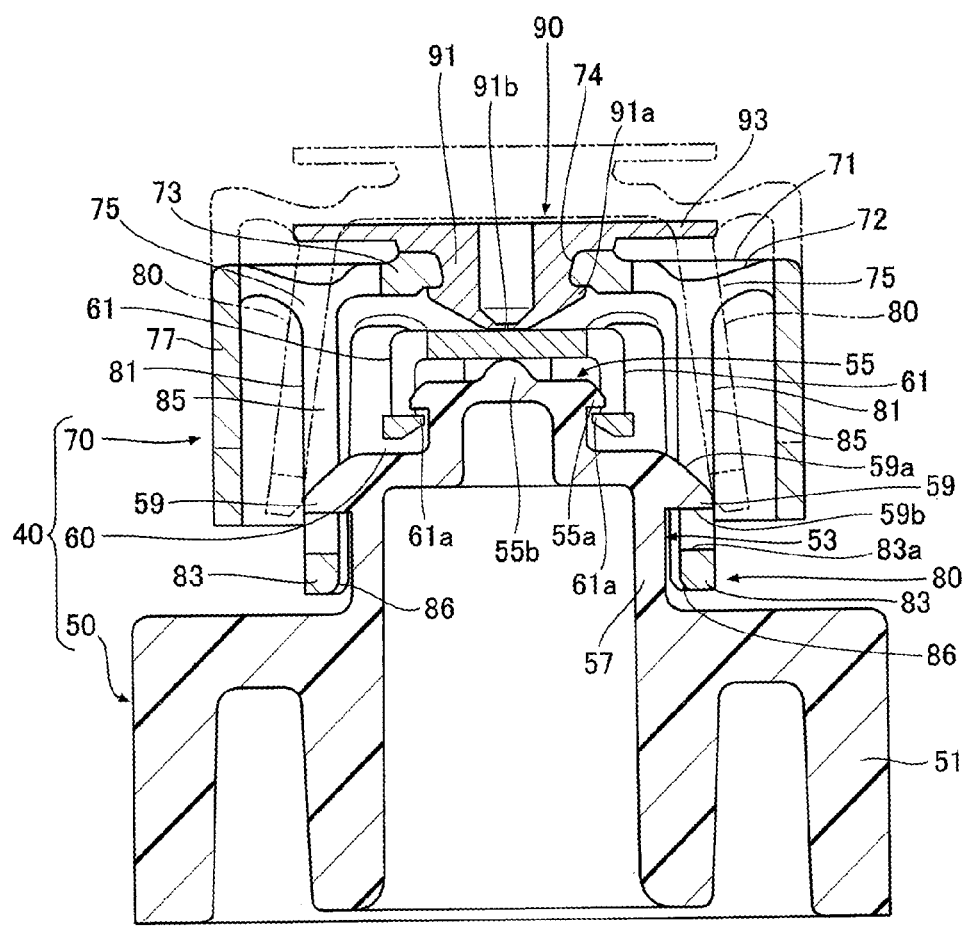
FIG. 6 is a sectional view of the float valve constituting the valve device.

As shown in FIGS. 1 and 6, the lower member 50 includes a lower main body 51 formed in a shape of a cylinder having a predetermined diameter; an upper member attaching portion 53 protruding from an upper center of the lower main body 51 and having a diameter smaller than the outer diameter of the lower main body 51; and a intermediate valve body attaching portion 55 protruding from an upper center of the upper member attaching portion 53 and having a diameter smaller than the outer diameter of the upper member attaching portion 53.

Figure 5:
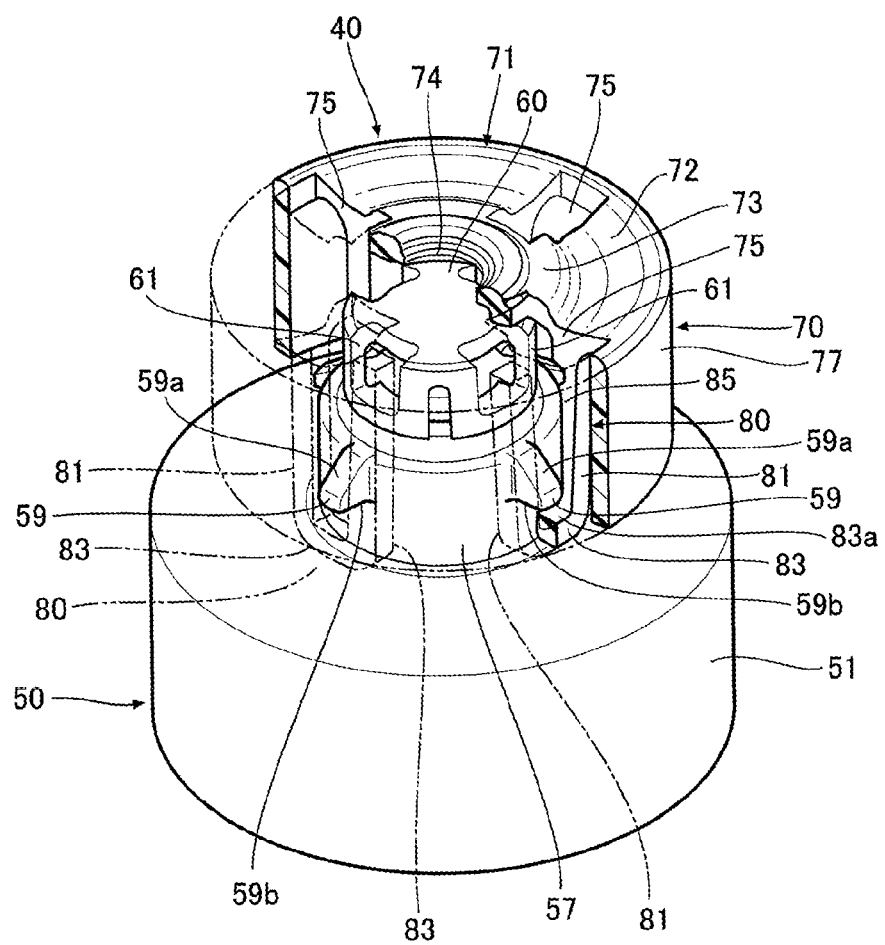
FIG. 5 is a perspective view of the float valve constituting the valve device in a partially broken state.

As shown in FIGS. 5 and 6, the upper member attaching portion 53 has a cylindrical peripheral wall 57, and on an upper outer circumference thereof, a plurality of (here, four) engaged portions 59 are provided to protrude at equal intervals in a circumferential direction thereof. Each of the engaged portions 59 has an outer surface configured as a tapered surface 59a, of which an amount of protrusion is gradually increased toward a lower side of the lower member, and also an engaged surface 59b is formed on a lower surface of the engaged portion 59 to be perpendicular to an axis of the lower member 50. But, the number of the engaged portions is not particularly limited, and also the engaged portions may have any other shapes so long as they can be engaged with elastic engaging pieces 80 provided on the upper member 70 as shown in FIGS. 2B and 5.

Also, as shown in FIGS. 1 and 6, the intermediate valve body attaching portion 55 has a structure, in which an annular protrusion 55a protrudes from an upper outer circumference thereof and a support protrusion 55b protrudes from an upper center thereof. The intermediate valve body 60 is mounted on the outer circumference of the intermediate valve body attaching portion 55. The intermediate valve body 60 is formed in a generally hat shape, in which an upper side thereof is closed and a plurality of frame-shaped locking frames 61 are provided on an outer circumference thereof.

Also, an upper center of the intermediate valve body 60 is supported on the support protrusion 55b and also a claw portion 61a (see FIG. 6) of each of the plurality of locking frames 61, which is provided on an inner side of a lower end thereof, is configured to be engageable with the annular protrusion 55a so that the intermediate valve body 60 is tiltably mounted on the intermediate valve body attaching portion 55. Meanwhile, as shown in FIG. 7, in a normal state, the intermediate valve body 60 abuts with a lower end of a shaft portion 91 of the seal member 90. Also, as shown in FIG. 8, in a closed state where the seal member 90 abuts against the opening 25 of the partition wall 23, the intermediate valve body 60 can always support the shaft portion 91 of the seal member 90 even if the lower member 50 rattles. Therefore, it is possible to inhibit reduction in seal property of the seal member 90 against an orifice hole 91b (see FIG. 6), as described below, provided in the seal member 90.

Next, the upper member 70 will be described. As shown in FIGS. 2A, 2B, 5 and 6, the upper member 70 according to the present embodiment includes a top portion 71 configured to be connected with and separated from the opening 25 of the partition wall 23; a generally cylindrical outside wall 77 extending from a back surface (lower surface) of the top portion 71; and elastic engaging pieces 80 extending from locations on the back surface of the top portion 71, which are located inward from the outside wall 77.

Figure 2A:
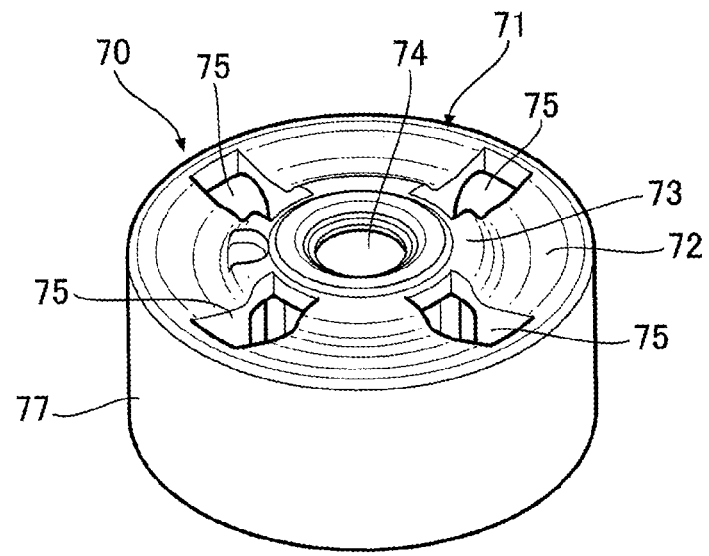
Figure 2B:
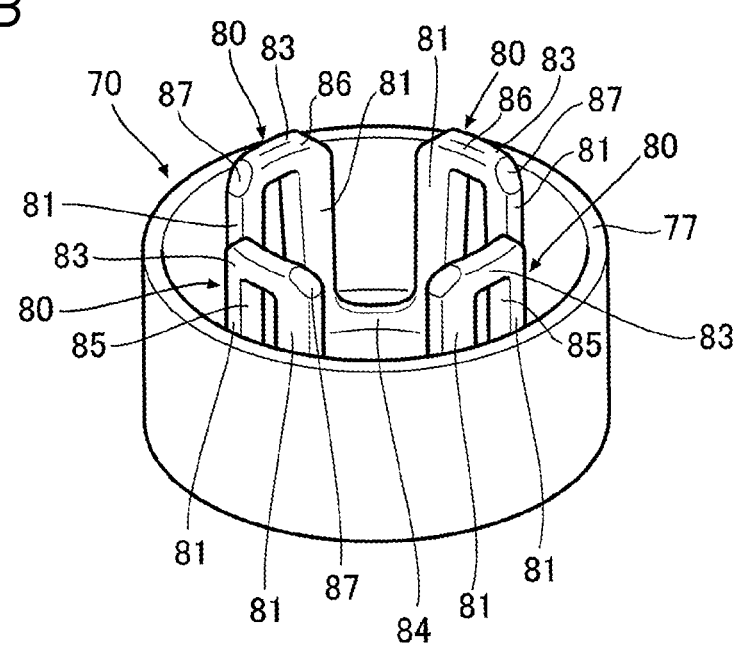

As shown in FIG. 2A, the top portion 71, which is formed in a generally circular disc shape, has an inclined surface 72 formed to be gradually lowered in a mortar shape from an outer circumferential edge portion thereof toward the center in an inward radial direction; a raised portion 73 formed by slightly raising a radial center portion thereof; and a circular support hole 74 formed at the center of the raised portion 73.

As shown in FIG. 6, the shaft portion 91 of the seal member 90 is inserted into the support hole 74. The seal member 90 is constituted of the shaft portion 91 having a protrusion 91a provided on an outer circumference of a distal end thereof; and a seal flange 93 extending from a circumferential edge of a base end of the shaft portion 91 in an annular shape. Also, the seal member 90 is integrally formed by an elastic material, such as rubber or elastic elastomer (see FIG. 6). Also, an orifice hole 91b having a small diameter is formed in the center portion of the lower end of the shaft portion 91. Further, by inserting the shaft portion 91 into the support hole 74 from a front side thereof and then locking the protrusion 91a on a peripheral edge of a back side of the support hole 74, the seal member 90 is mounted on the upper member 70 in a state where the seal flange 93 is arranged on a front surface (upper surface) side of the top portion 71.

Figure 3:
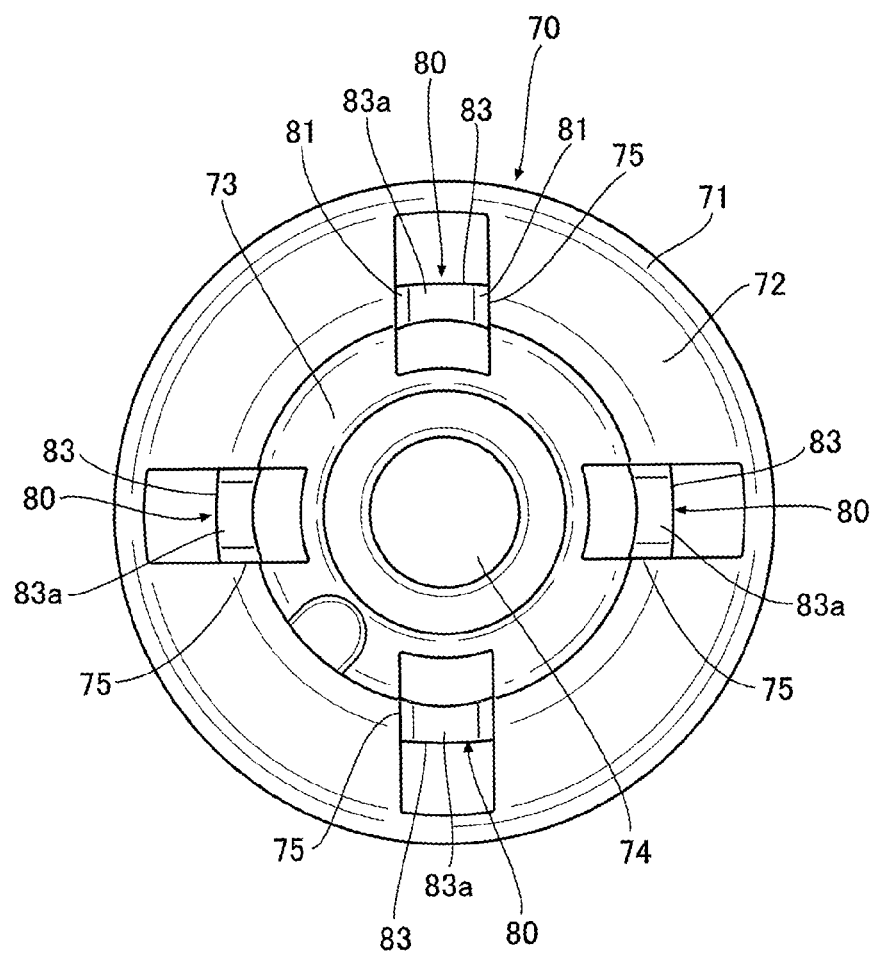
FIG. 3 is a plan view of the upper member constituting the valve device.
Figure 4:
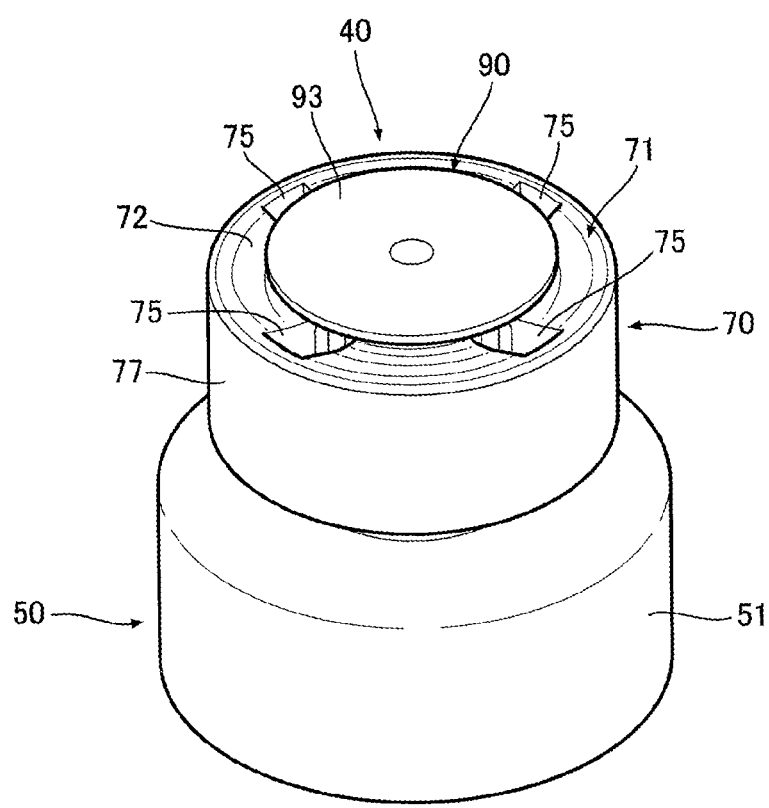
FIG. 4 is a perspective view of a float valve constituting the valve device in an assembled state.

Also, as shown in FIG. 2A, the top portion 71 is provided with a plurality of through-holes 75 extending through the top portion 71. The through-holes 75 according to the present embodiment are formed at equal intervals in a radial shape with respect to the radial center of the top portion 71. Also, the through-holes 75 are formed to extend in a rectangular shape by a length ranging from an outer circumference of the raised portion 73 to slightly in front of the outer circumferential edge of the top portion 71. Further, as shown in FIGS. 2A, 2B, 3 and 5, the through-holes 75 are provided at locations aligning with the elastic engaging pieces 80 and also formed to be contiguous to engaging holes 85 (see FIG. 5) provided in the elastic engaging pieces 80. That is, as shown in FIG. 3, as viewed in an axial direction of the upper member 70, the through-holes 75 align with a circumferential direction of the top portion 71 and also a radial direction of the top portion 71, so that the through-holes 75 are provided at locations where engaging surfaces 83a (inner surfaces of engaging walls 83 as described below) of the elastic engaging pieces 80, which engage with the engaged portions 59 of the lower member 50, are visible through the through-holes 75. Alternatively, the through-holes 75 may be, for example, a round hole, a square hole, a long hole extending in the circumferential direction of the top portion, or the like. Accordingly, the shape of the through-holes 75 is not particularly limited and also the number thereof is not particularly limited.

Meanwhile, as shown in FIGS. 5 and 6, the outside wall 77 is formed in a generally cylindrical shape extending downward from the outer circumferential edge of the back surface side of the generally circular disc-shaped top portion 71 by a predetermined length. The outside wall 77 is arranged near to a plurality of guide ribs 27 provided on an inner circumference of the peripheral wall 21 and thus serves as a lifting guide for the upper member 70 when the float valve moves up and down. However, the outside wall is not limited to the cylindrical shape as described above. For example, the outside wall may be formed by a plurality of columnar pieces extending downward from the back surface of the top portion 71 and also may have any other configurations having a guidablity with respect to the inner circumferential wall of the housing.

Also, as shown in FIGS. 5 and 6, the elastic engaging pieces 80 extending from locations on the back surface of the top portion 71, which are located inward from the outside wall 77, extend from locations on the back surface of the top portion 71, which align with the through-holes 75 and also correspond to the lowest location (here, a position of the outer circumference of the raised portion 73) on the inclined surface 72 of the top portion 71. More specifically, as shown in FIGS. 2A, 2B and 5, each of the elastic engaging pieces 80 according to the present embodiment, is formed in a generally U-frame shape by a pair of extending walls 81, 81 extending from both side edge portions of a back side of the respective through-hole 75 by a predetermined length while straddling the through-hole 75; and an engaging wall 83 connecting distal ends, in the extending direction, of the pair of extending walls 81, 81 with each other. Also, an inner surface of the engaging wall 83 is an engaging surface 83a configured to engage with the engaged surface 59b of the engaged portion 59. Meanwhile, as shown in FIG. 2B, base ends of the adjacent extending walls 81, 81 of the adjacent elastic engaging pieces 80, 80 are connected with each other by a connection wall 84, thereby preventing deformation of the extending walls 81 and thus ensuring a strength thereof.

Also, in the inside of the elastic engaging piece 80 having the generally U-frame shape, an engaging hole 85 is provided to be contiguous to the respective through-hole 75 and also to extend in a long hole shape by a predetermined length. Also, each of the elastic engaging pieces 80 extends to protrude more than an extending direction distal end portion of the outside wall 77. Further, as shown in FIG. 5, the smallest inner diameter defined by the plurality of elastic engaging pieces 80 is sized to be suitable to an outer diameter of the peripheral wall 57 of the upper member attaching portion 53 of the lower member 50.

Also, the protrusion-shaped engaged portions 59 of the lower member 50 enter inside the respective engaging holes 85, so that the upper member 70 is attached on the lower member 50 to be movable up and down by a predetermined distance relative to the lower member 50. In the present embodiment, when the upper member 70 is attached on the lower member 50, the plurality of elastic engaging pieces 80 are arranged on the outer circumference of the peripheral wall 57 of the upper member attaching portion 53, so that up and down movement of the upper member 70 is guided by the peripheral wall 57 and the plurality of elastic engaging pieces 80. In addition, the upper member 70 is configured to be tiltable relative to the lower member 50.

Also, as shown by an imaginary line in FIG. 6, when the upper member 70 is attached on the upper member attaching portion 53 of the lower member 50 by arranging the upper member 70 on the outer circumference of the upper member attaching portion 53 to align the engaging holes 85 of the elastic engaging pieces 80 of the upper member 70 with the engaged portions 59 of the lower member 50 and then pushing the upper member 70 onto the lower member 50, the extending direction distal ends of the elastic engaging pieces 80 are pressed by the engaging portions 59 so that the elastic engaging pieces 80 are bent in an outward radial direction of the upper member 70. Then, once the distal ends of the elastic engaging pieces 80 climb over the engaged portions 59, the engaged portions 59 enter inside the engaging holes 85 and also the elastic engaging pieces 80 elastically return to engage with the engaged surfaces 59b of the engaged portions 59. That is, the elastic engaging pieces 80 are designed to elastically return after being bent in the outward radial direction of the upper member 70, thereby engaging with the engaged portions 59b. As a result, the upper member 70 is attached on the lower member 50 in such a manner that the upper member 70 is prevented from being separated from the lower member 50. Also, as described above, since the engaged portions 59 of the lower member 50 enter the engaging holes 85 in the elastic engaging pieces 80, the upper member 70 is inhibited from being rotated relative to the upper member attaching portion 53 of the lower member 50.

In addition, as shown in FIGS. 2B and 6, an inner surface of the extending direction distal end of each of the elastic engaging pieces 80 (an inner surface of a distal end of the engaging wall 83) has a rounded surface 86 formed to have a predetermined curvature. When the upper member 70 is pushed to bend the elastic engaging pieces 80 upon attaching of the upper member 70 on the upper member attaching portion 53 as described above, the rounded surface 86 facilitates abutting the elastic engaging pieces 80 against the tapered surfaces 59a of the engaged portions 59, thereby facilitating bending of the elastic engaging pieces 80. Further, chamfered portions 87 cut at a predetermined angle are respectively formed on both side surfaces of the extending direction distal end of each of the elastic engaging pieces 80 (outer surfaces of the distal ends of the extending walls 81). The chamfered portions 87 facilitate tilting of the upper member 70 relative to the lower member 50 upon tilting thereof.

Next, the operation and effect of the valve device 10 according to the present disclosure having the above configuration will be described.

The valve device 10 is configured to reduce the entire height of the float valve 40 while ensuring a bent amount of the elastic engaging pieces 80 when the upper member 70 is attached on the lower member 50. That is, the upper member 70 is arranged on the outer circumference of the upper member attaching portion 53 to align the engaging holes 85 of the upper member 70 with the engaged portions 59 of the lower member 50, and then the upper member 70 is pushed onto the lower member 50. Thus, the rounded surface 86 of the engaging wall 83 of the elastic engaging pieces 80 are pressed by the tapered surface 59a of the engaging portions 59 so that the elastic engaging pieces 80 are bent in the outward radial direction of the upper member 70. Then, once the distal ends of the elastic engaging pieces 80 climb over the engaged portions 59, the engaged portions 59 enter inside the engaging holes 85 and also the elastic engaging pieces 80 elastically return so that the engaging surface 83a of the engaging wall 83 of the elastic engaging pieces 80 engages with the engaged surface 59b of the engaged portions 59.

As described above, since the elastic engaging pieces 80 elastically return after being bent in the outward radial direction of the upper member 70 and thus engage with the engaged portions 59 of the lower member 50, the elastic engaging pieces 80 need to have a certain length in order to ensure a bent amount thereof. In this regard, the elastic engaging pieces 80 in the valve device 10 extend from locations on the back surface of the top portion 71 of the upper member 70, which are located inward from the outside wall 77. Therefore, as compared with a structure, in which engaging pieces extend from a lower end of a first cylindrical valve portion as in Patent Document 1, it is easy to ensure a length of the elastic engaging pieces 80, thereby reducing the entire height of the upper member 70.

However, FIG. 7 shows a state where an amount of fuel in the fuel tank (not shown) is small and thus a buoyancy caused by the fuel does not act on the float valve 40, so that the opening 25 of the partition wall 23 is opened. From this state, if the fuel is fed into the fuel tank and thus the float valve 40 is immersed into the fuel, the float valve 40 moves up by a buoyancy of the float valve 40 itself and an urging force of the spring 38. Thus, as shown in FIG. 8, the seal flange 93 of the seal member 90 mounted on the upper member 70 abuts against a back side circumferential edge portion of the opening 25 of the partition wall 23, thereby closing the opening 25. At this time, as shown in FIG. 8, the seal flange 93 of the seal member 90 is pressed by the back side circumferential edge of the opening 25, so that the seal flange 93 closes the opening 25 while being slightly bent and deformed in a generally reversed V-shape. As a result, a pressure in the fuel tank is increased and feeding of the fuel is stopped. Thus, a so-called full tank regulation is performed.

Since the buoyancy of the float valve 40 is mainly obtained by immersing the lower member 50 below a liquid surface of the fuel, a protruding height of the upper member 70 from the lower member 50 influences a height of the liquid surface of the fuel when the seal member 90 reaches the opening 25 of the partition wall 23. That is, if the upper member 70 protrudes higher from the lower member 50, a timing, at which the seal member 90 of the float valve 40 abuts against the opening 25 of the partition wall 23 to close the opening 25, becomes faster so that a height of the liquid surface for regulating an amount of fuel to be fed into the fuel tank, so-called lock point becomes lower, thereby correspondingly decreasing an amount of fuel supplied to the fuel tank. On the other hand, if a protrusion amount of the upper member 70 from the lower member 50 becomes lower by limiting a height of the upper member 70, a timing, at which the seal member 90 of the float valve 40 abuts against the opening 25 of the partition wall 23 to close the opening 25, becomes slower, so that the lock point becomes higher, thereby correspondingly increasing an amount of fuel supplied to the fuel tank As described above, according to the valve device 10, the entire height of the upper member 70 can be reduced so that the entire height of the float valve 40 can be reduced and thus the protrusion amount of the upper member 70 from the lower member 50 can also be reduced. Accordingly, it is possible to allow the lock point to become higher and thus to increase an amount of fuel supplied to the fuel tank. Further, since the lock point can become higher, a full tank detecting liquid surface of the fuel tank can be set to an upper side of the tank, thereby making it easy to apply the valve device to a thin tank or the like and thus enhancing flexibility in layout of the tank.

Also, as described above, the valve device 10 according to the present embodiment serves as a so-called full tank regulation valve for preventing overfeeding of the fuel by closing the opening 25 if a liquid surface in the fuel tank reaches the full tank liquid surface. Alternatively, the valve device 10 may serve as a so-called fuel outflow prevention valve for preventing a leakage of fuel to the outside by causing the float valve 40 to close the opening 25 when a liquid surface in the fuel tank is abnormally raised due to fluctuation of the fuel or the like.

For example, if a vehicle turns around a curve, runs on an uneven road, slope or the like, or falls down or turns over due to an accident so that the fuel in the fuel tank fluctuates to raise the liquid surface of the fuel, the float valve 40 moves up by an urging force of the spring 38 and a buoyancy of the float valve 40 itself and thus the seal flange 93 of the seal member 90 abuts against the back side circumferential edge portion of the opening 25, thereby closing the opening 25. Accordingly, flowing of the fuel into the vent chamber R through the opening 25 is blocked, thereby preventing a leakage of the fuel to the outside of the fuel tank.

However, as described above, if a vehicle is rolled or pitched by turning around a corner or running an uneven road, slope or the like, the fuel in the fuel tank also fluctuates. As a result, the fuel is likely to flow into the valve chamber V through the venting groove 21a of the housing 15 and thus to be accumulated on the surface of the top portion 71 of the upper member 70. However, according to the valve device 10 of the present embodiment, the top portion 71 of the upper member 70 is provided with the through-holes 75 extending through the top portion 71 and positioned to align with the elastic engaging pieces 80. Accordingly, even in such a case, as shown by arrows in FIG. 8, the fuel accumulated on the top portion 71 of the upper member 70 can flow down along the elastic engaging pieces 80 through the through-holes 75 and then can be discharged toward the lower member 50, thereby inhibiting an leakage of the fuel through the opening 25 of the partition wall 23.

Further, since the through-holes 75 are provided, the front surface of the top portion 71 and the back surface of the seal flange 93 of the seal member 90 are less likely to come into close contact with each other. Accordingly, it is possible to prevent the seal flange 93 from sticking to the surface of the top portion 71, thereby maintaining a bending deformability of the seal flange 93. Therefore, as shown in FIG. 8, the seal flange 93 can be abutted against the back side circumferential edge of the opening 25 of the partition wall 23 in a bent and deformed state, thereby maintaining a sealing property between the opening 25 and the seal flange 93.

Further, according to the present embodiment, the elastic engaging pieces 80 have the engaging holes 85 configured to engage with the engaged portions 59 of the lower member 50, and the through-holes 75 provided in the top portion 71 are formed to be contiguous to the engaging holes 85 of the elastic engaging pieces 80. Therefore, the fuel accumulated on the surface of the top portion 71 of the upper member 70 can quickly drop along the elastic engaging pieces 80 through the through-holes 75, thereby allowing the fuel to be more quickly discharged toward the lower member 50. Also, since the elastic engaging pieces 80 are configured to be easily bent, a length thereof can be reduced and thus a height of the upper member 70 can also be reduced.

Further, according to the present embodiment, the elastic engaging pieces 80 extend to protrude more than the extending direction distal end portion of the outside wall 77 of the upper member 70. Accordingly, even if fuel is accumulated between the outside wall 77 and the elastic engaging pieces 80, the fuel can flow along the elastic engaging pieces 80 so that the fuel is reliably discharged from between the outside wall 77 and the elastic engaging pieces 80, thereby inhibiting a leakage of the fuel through the opening 25 of the partition wall 23.

Further, according to the present embodiment, the top portion 71 of the upper member 70 has the inclined surface 72 formed to be lowered toward the inward radial direction thereof, and each of the elastic engaging pieces 80 extends from the lowest location on the inclined surface 72 of the top portion 71. Accordingly, the fuel accumulated on the surface of the top portion 71 of the upper member 70 can be smoothly guided toward a bottom side of the through-holes 75 via the inclined surface 72, thereby allowing the fuel to be effectively discharged toward the lower member 50. As a result, it is possible to more reliably inhibit a leakage of the fuel through the opening 25 of the partition wall 23.

Further, according to the present embodiment, the elastic engaging pieces 80 are provided inward from the outside wall 77. Accordingly, when the upper member 70 is attached on the lower member 50, the upper member 70 can be pushed onto the lower member 50 while the outside wall 77 is grasped, so that the upper member 70 can be attached on the lower member 50 while bending the elastic engaging pieces 80, thereby enhancing a workability in attaching (in the case where no outside wall 77 is provided, the upper member has to be pushed while, for example, the elastic engaging pieces, which can be bent and deformed, are grasped, thereby making attaching thereof difficult). Further, the outside wall 77 is located outward from the elastic engaging pieces 80. Accordingly, even if the elastic engaging pieces 80 are bent in the outward radial direction from the engaged portions 59 of the lower member 50 due to an external force, impact force and the like, bending thereof can be limited, thereby making it difficult for the upper member 70 to be separated from the lower member 50. As a result, it is possible to maintain the upper member 70 on the lower member 50 while reliably preventing separation thereof. Further, even if the outside wall 77 is swollen by the fuel, this hardly influences the elastic engaging pieces 80 located inward therefrom, and thus the elastic engaging pieces 80 are hardly swollen, thereby inhibiting rattling of the upper member 70 and the like. In addition, the elastic engaging pieces 80 are arranged inward from the outside wall 77, and the engaging holes 85 provided in the elastic engaging pieces 80 are covered with the outside wall 77, except distal end sides thereof. Accordingly, even if an impact force acts from the outside of the upper member 70, the impact force first acts on the outside wall 77, thereby inhibiting the impact force from directly acting on the elastic engaging pieces 80.

Further, the present invention is not limited to the foregoing embodiments, and accordingly various modified embodiments are possible within the spirit and scope of the present invention. Such embodiments are intended to be encompassed within the scope of the present invention.

What is claimed is:

1. A valve device for a fuel tank, comprising:
a housing provided with a valve chamber on a lower side thereof and a vent chamber on an upper side thereof defined via a partition wall therebetween, wherein the valve chamber communicates with the fuel tank and the vent chamber communicates with a fuel vapor discharging port, and wherein the partition wall is provided with an opening communicating the valve chamber with the vent chamber; and
a float valve for opening and closing the opening, received in the valve chamber to be movable up and down therein,
wherein the float valve comprises a lower member forming a float main body and including an engaged portion, and an upper member attached on top of the lower member to be movable up and down by a predetermined distance relative to the lower member,
wherein the upper member comprises a top portion configured to be connected with and separated from the opening, an outside wall extending from a back surface of the top portion, and an elastic engaging piece configured to engage with the engaged portion of the lower member,
wherein the elastic engaging piece extends from a location on the back surface of the top portion, which is located inward from the outside wall, and is configured to elastically return after being bent in an outward radial direction of the upper member to engage with the engaged portion of the lower member,
wherein the top portion is provided with a through-hole extending through the top portion and positioned to align with the elastic engaging piece such that, in a valve axial direction, the through-hole overlaps with the elastic engaging piece, and
wherein the through-hole is provided so as to be exposed inside the valve chamber in a state where the top portion of the upper member is in contact with the opening of the partition wall.

2. The valve device according to claim 1, wherein the elastic engaging piece includes an engaging hole configured to engage with the engaged portion of the lower member, and
wherein the through-hole is formed to communicate with the engaging hole of the elastic engaging piece.

3. The valve device according to claim 1, wherein the elastic engaging piece extends to protrude more than an extending direction distal end portion of the outside wall.

4. The valve device according to claim 1, wherein the top portion includes an inclined surface formed to be lowered toward the inward radial direction thereof, and
wherein the elastic engaging piece extends from the lowest location on the inclined surface of the top portion.

5. The valve device according to claim 1, wherein, in the outward radial direction, the outside wall is exposed to the elastic engaging piece.

6. The valve device according to claim 1, wherein, in the outward radial direction, an inner circumference surface of the outside wall is exposed an outer circumference surface of the elastic engaging piece.

7. The valve device according to claim 1, wherein, in the outward radial direction, the outside wall directly faces the elastic engaging piece.

8. The valve device according to claim 1, wherein, in the outward radial direction, an inner circumference surface of the outside wall directly faces an outer circumference surface of the elastic engaging piece.

9. The valve device according to claim 1, wherein the outside wall encircles the elastic engaging piece.

10. The valve device according to claim 1, wherein, in an axial direction of the upper member, the elastic engaging piece protrudes toward the top portion more than a distal end of the outside wall.

11. The valve device according to claim 1, wherein, with respect to a bottom surface of the upper member, a distal end of the elastic engaging piece is located higher than a distal end of the outside wall.

12. The valve device according to claim 1, wherein the elastic engaging piece includes:
a pair of extending walls configured to extend in opposing sides of the engaged portion; and
an engaging wall that connects distal ends of the pair of extending walls.

13. The valve device according to claim 12, wherein the elastic engaging piece further includes:
an engaging hole being surrounded by the engaging wall and the pair of extending walls.

14. The valve device according to claim 13, wherein the outside wall surrounds to encircle the engaging hole.

15. The valve device according to claim 14, wherein a distal end of the engaging hole is located higher than a distal end of the outside wall.

16. The valve device according to claim 1, wherein the elastic engaging piece includes a pair of extending walls extending in opposing sides of the engaged portion to engage the elastic engaging piece with the engaged portion.

17. The valve device according to claim 16, wherein the elastic engaging piece further includes an engaging wall connecting distal ends of the pair of extending walls, and
wherein the elastic engaging piece has a U-shape in which the engaging wall extends between the distal ends of the pair of extending walls.

18. The valve device according to claim 17, wherein the U-shape of the elastic engaging piece defines an engaging hole in the elastic engaging piece, the engaging hole being surrounded by the engaging wall and the pair of extending walls, and
wherein the engaged portion penetrates inside the engaging hole to attach the upper member to the lower member.

19. The valve device according to claim 1, wherein, in the state where the top portion of the upper member is in contact with the opening of the partition wall, a top surface of the through-hole is spaced apart from a bottom surface of the top portion of the upper member.

20. A valve device for a fuel tank, comprising:
a housing provided with a valve chamber on a lower side thereof and a vent chamber on an upper side thereof defined via a partition wall therebetween, wherein the valve chamber communicates with the fuel tank and the vent chamber communicates with a fuel vapor discharging port, and wherein the partition wall is provided with an opening communicating the valve chamber with the vent chamber; and
a float valve for opening and closing the opening, received in the valve chamber to be movable up and down therein, wherein the float valve comprises a lower member forming a float main body and including an engaged portion, and an upper member attached on top of the lower member to be movable up and down by a predetermined distance relative to the lower member, wherein the upper member comprises a top portion configured to be connected with and separated from the opening, an outside wall extending from a back surface of the top portion, and an elastic engaging piece configured to engage with the engaged portion of the lower member, wherein the elastic engaging piece extends from a location on the back surface of the top portion, which is located inward from the outside wall, and is configured to elastically return after being bent in an outward radial direction of the upper member to engage with the engaged portion of the lower member, wherein the elastic engaging piece includes an engaging hole configured to engage with the engaged portion of the lower member, wherein the elastic engaging piece includes a pair of extending walls extending in opposing sides of the engaged portion to engage the elastic engaging piece with the engaged portion, wherein the elastic engaging piece includes an engaging wall connecting distal ends of the pair of extending walls, wherein the engaging wall and the pair of extending walls surround the engaging hole to define the engaging hole, wherein the top portion is provided with a through-hole extending through the top portion, wherein the engaging wall is provided at a location where the engaging wall is visible through the through-hole in a valve axial direction, and wherein the through-hole is provided so as to be exposed inside the valve chamber a state where the top portion of the upper member is in contact with the opening of the partition wall.

* * * * *